United States Patent
Moon et al.

(10) Patent No.: US 9,697,399 B2
(45) Date of Patent: Jul. 4, 2017

(54) ACTIVE RADIO FREQUENCY IDENTIFICATION TAG APPLIED TO LOGISTICS TRACKING SYSTEM AND COMMUNICATION METHOD THEREOF

(71) Applicant: Korea Electronics Technology Institute, Seongnam-si, Gyeonggi-do (KR)

(72) Inventors: Yoen Kug Moon, Seoul (KR); Dong Hyun Lee, Seoul (KR); Sung Hun Chae, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 14/787,675

(22) PCT Filed: Jan. 30, 2015

(86) PCT No.: PCT/KR2015/001031
§ 371 (c)(1),
(2) Date: Oct. 28, 2015

(87) PCT Pub. No.: WO2016/122027
PCT Pub. Date: Aug. 4, 2016

(65) Prior Publication Data
US 2016/0371521 A1 Dec. 22, 2016

(30) Foreign Application Priority Data
Jan. 30, 2015 (KR) ........................ 10-2015-0015301

(51) Int. Cl.
*G06K 7/10* (2006.01)
*G08C 17/02* (2006.01)
(52) U.S. Cl.
CPC ..... *G06K 7/10445* (2013.01); *G06K 7/10227* (2013.01); *G08C 17/02* (2013.01)

(58) Field of Classification Search
CPC .......... G06K 7/10227; G06K 7/10297; G06K 7/10306; G06K 7/10366; H04B 1/71637;
(Continued)

(56) References Cited

U.S. PATENT DOCUMENTS

2007/0194945 A1* 8/2007 Atkinson ............... G08C 17/02
340/13.26
2015/0002272 A1* 1/2015 Alonso ............. G06K 7/10227
340/10.1

FOREIGN PATENT DOCUMENTS

KR 10-2006-0005237 A 1/2006
KR 10-0812534 B1 3/2008
(Continued)

OTHER PUBLICATIONS

Korean Patent Office, Office Action for KR 10-2015-0015301 dated Jan. 30, 2015.
(Continued)

*Primary Examiner* — Ali Neyzari
(74) *Attorney, Agent, or Firm* — Sughrue Mion, PLLC

(57) ABSTRACT

A communication method of an active radio frequency identification (RFID) tag attached to a product or a pallet is provided. The method includes: transmitting movement completion information to a reader by using a communication channel, which consumes power of a battery, at a time when movement of the product or the pallet which is moving is not sensed, the movement completion information indicating movement completion of the moving product or pallet; receiving a request message, requesting position information of the tag corresponding to the movement completion information, from the reader by using the communication channel; activating a positioning channel, which consumes relatively more power of the battery that the communication channel, to transmit positioning information to the reader by using the activated positioning channel in
(Continued)

response to the request message received through the communication channel; and when the transmission of the positioning information is completed, deactivating the positioning channel.

8 Claims, 5 Drawing Sheets

(58) Field of Classification Search
CPC .......... H04B 1/71635; G06F 17/30876; G08C 19/00; G08C 17/02
USPC .......................... 340/10.1, 10.3, 13.26, 5.74
See application file for complete search history.

(56) References Cited

FOREIGN PATENT DOCUMENTS

| KR | 10-2008-0047841 A | 5/2008 |
|---|---|---|
| KR | 10-0831840 B1 | 5/2008 |
| KR | 10-2009-0104168 A | 10/2009 |
| KR | 10-0979507 B1 | 9/2010 |
| KR | 10-2013-0113040 A | 10/2013 |

OTHER PUBLICATIONS

International Searching Authority International Search Report for PCT/KR2015/001031 dated Oct. 21, 2015.

* cited by examiner

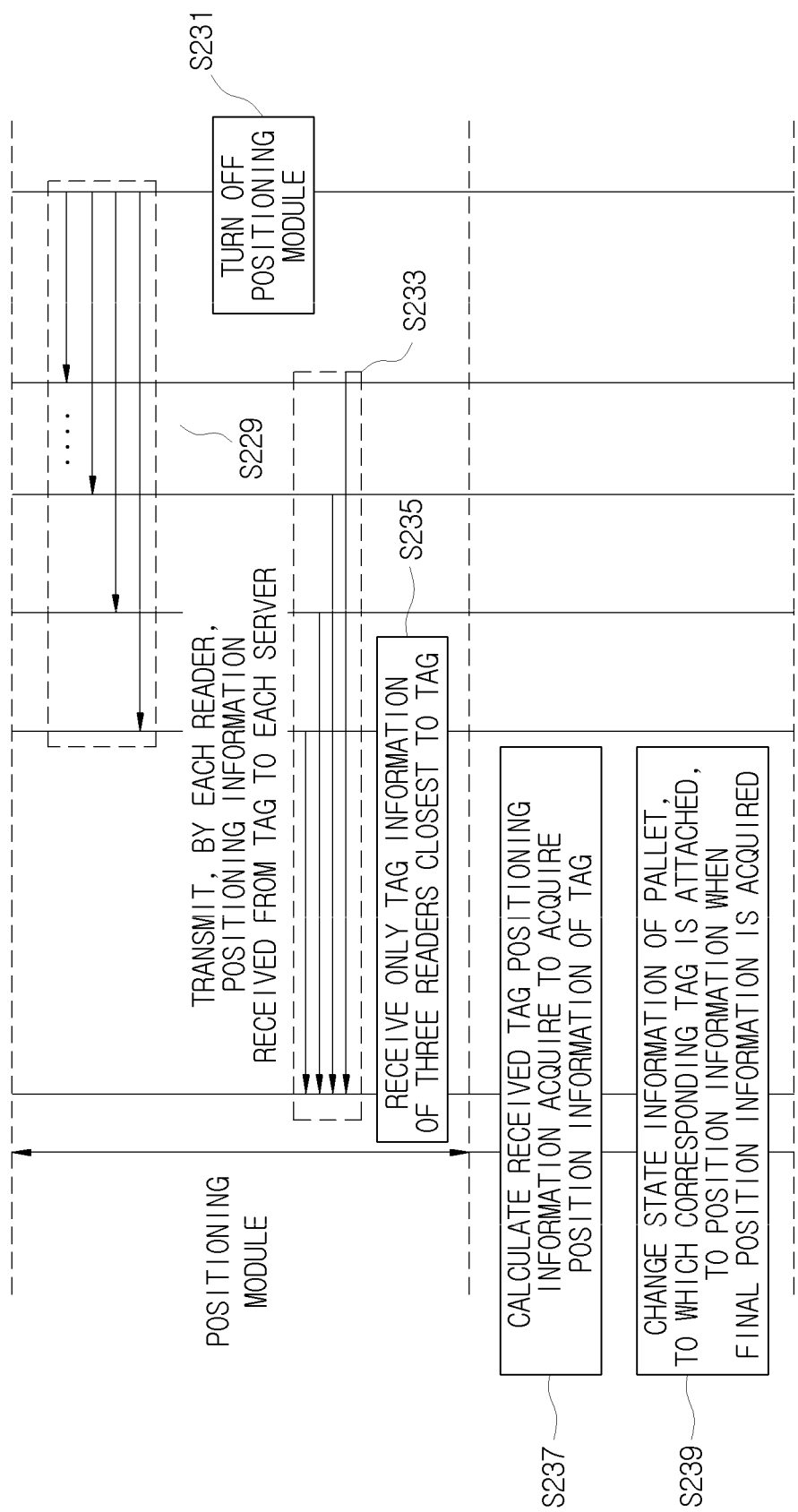

ACTIVE RADIO FREQUENCY IDENTIFICATION TAG APPLIED TO LOGISTICS TRACKING SYSTEM AND COMMUNICATION METHOD THEREOF

CROSS-REFERENCE TO RELATED APPLICATIONS

This application is a National Stage of International Application No. PCT/KR2015/001031 filed Jan. 30, 2015, claiming priority to Korean Patent Application No. 10-2015-0015301, filed on Jan. 30, 2015 the disclosure of which are incorporated herein by reference in their entirety.

TECHNICAL FIELD

The present invention relates to an active radio frequency identification (RFID) tag applied to a logistics tracking system and a communication method thereof.

BACKGROUND

Recently, a logistics tracking system based on an RFID system is being widely used. The RFID system applied to logistics tracking technology may be largely categorized into a system using an active RFID tag and a system using a passive RFID tag.

The active RFID tag includes a battery, but the passive RFID tag does not include a battery. Since the active RFID tag includes the battery, management for decreasing power consumption of the battery is important.

A logistics tracking system to which a related art active RFID tag is applied includes an active RFID position module that allows an active RFID tag to measure its own position.

A related art active RFID positioning module uses a communication channel having a broad bandwidth for transmitting, to a reader, positioning information obtained by measuring its own position, and for this reason, the amount of power consumed by a battery is large.

Moreover, the related art active RFID positioning module also transmits simple tag information other than positioning information to the reader, but a communication channel having a broad bandwidth which is the same as bandwidth for transmitting the positioning information is used for transmitting the simple tag information. For this reason, the amount of power consumed by a battery is far larger.

Therefore, it is required to develop a method of efficiently managing power of a battery, for applying the related art active RFID positioning module to a logistics tracking system.

SUMMARY

Accordingly, the present invention provides an active radio frequency identification (RFID) tag applied to a logistics tracking system and a communication method thereof, which reduce the amount of power consumed by a battery.

In one general aspect, a communication method of an active radio frequency identification (RFID) tag (hereinafter referred to as a tag) attached to a product or a pallet includes: transmitting movement completion information to a reader by using a communication channel, which less consumes power of a battery, at a time when movement of a product or a pallet which is moving is not sensed, the movement completion information indicating movement completion of the moving product or pallet; receiving a request message, requesting position information of the tag corresponding to the movement completion information, from the reader by using the communication channel; activating a positioning channel, which relatively more consumes the power of the battery, to transmit positioning information to the reader by using the activated positioning channel in response to the request message received through the communication channel; and when the transmission of the positioning information is completed, deactivating the positioning channel.

In another general aspect, an active radio frequency identification (RFID) tag (hereinafter referred to as a tag) attached to a product or a pallet includes: a battery; a communication module configured to communicate with a reader by using a communication channel which less consumes power of the battery; a positioning module configured to communicate with the reader by using a positioning channel which relatively more consumes the power of the battery; and a controller configured to control the communication module and the positioning module to transmit movement completion information, indicating movement completion of a product or a pallet which is moving, to the reader through the communication channel at a time when movement of the moving product or pallet is not sensed, and when a request message requesting position information of the tag corresponding to the movement completion information is received from the reader through the communication channel, in response to the request message, deactivate the communication module and activate the positioning module to transmit positioning information to the reader by using the activated positioning module.

In another general aspect, a communication method between an active radio frequency identification (RFID) tag (hereinafter referred to as a tag) attached to a product or a pallet, a reader, and a server, which are included in a logistics tracking system, includes: transmitting movement completion information to the reader by using a communication channel, which less consumes power of a battery, at a time when movement of a product or a pallet which is moving is not sensed, the movement completion information indicating movement completion of the moving product or pallet; transmitting, by the reader, the movement completion information to the server over a wired or wireless network; transmitting, by the server, a request message requesting position information of the tag to the reader in response to the movement completion information; and receiving, by the tag, the request message from the reader by using the communication channel, deactivating the communication channel, activating a positioning channel which relatively more consumes the power of the battery, transmitting positioning information to the reader by using the activated positioning channel in response to the received request message, and when the transmission of the positioning information is completed, deactivating the positioning channel.

Other features and aspects will be apparent from the following detailed description, the drawings, and the claims.

BRIEF DESCRIPTION OF THE DRAWINGS

FIGS. 2A and 2B are a flowchart illustrating a flow of information transmitted or received between a tag, a server, and a plurality of readers included in the logistics tracking system illustrated in FIG. 1.

DETAILED DESCRIPTION OF EMBODIMENTS

The present invention relates a logistics tracking system based on a real-time locating system (RTLS) using an active RFID and continuously tracks a position until after a product is released from a time when the product is warehoused.

Moreover, the present invention may separate a communication channel for transmitting positioning information and a communication channel for transmitting tag information, and the communication channel for transmitting the tag information may be designed to have a bandwidth which is relatively narrower than that of the communication channel for transmitting the positioning information. The tag information may be transmitted at a bandwidth of the communication channel for transmitting the positioning information even when transmitting the tag information, and thus, the incidence of waste of a bandwidth is reduced. Also, power consumption of a battery caused by the use of a broad bandwidth is reduced.

Furthermore, in the present invention, an active RFID tag may not periodically transmit positioning information to a reader but may transmit the positioning information to the reader at only a specific time when there is no movement of the active RFID tag, and thus, the number of transmissions of the positioning information is reduced, thereby further decreasing power consumption of a battery.

Hereinafter, embodiments of the present invention will be described in detail with reference to the accompanying drawings.

Figure 1:
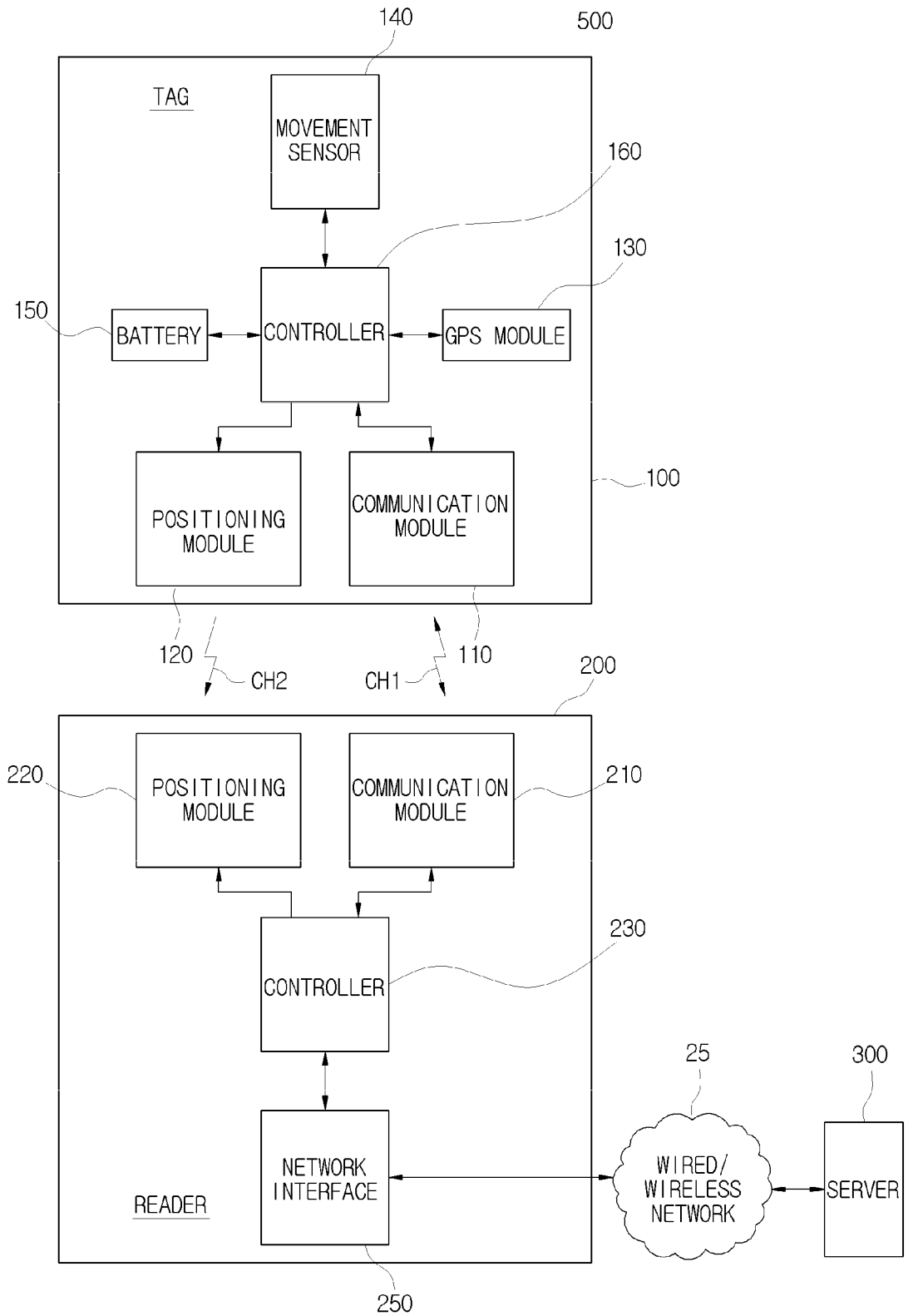
FIG. 1 is a block diagram schematically illustrating a whole configuration of a logistics tracking system according to an embodiment of the present invention.

FIG. 1 is a block diagram schematically illustrating a whole configuration of a logistics tracking system 500 according to an embodiment of the present invention.

Referring to FIG. 1, the logistics tracking system 500 may include an active RFID tag (hereinafter referred to as a tag) 100, a plurality of RFID readers (hereinafter referred to as a reader) 200, and a logistics management server (hereinafter referred to as a server) 300. In FIG. 1, in order to help understanding of description, only one reader 200 is illustrated.

The tag 100 may be disposed at (or attached to) a specific position of a product or a pallet for carrying the product and may transmit tag information and positioning information to the reader 200. In this case, the tag 100 may transmit the tag information to the reader 200 by using a communication channel having a first bandwidth and may transmit the positioning information to the reader 200 by using a communication channel having a second bandwidth which is broader than the first bandwidth.

A related art tag is designed to transmit tag information and positioning information to the reader 200 by using one communication channel having a broad bandwidth of 200 Mhz. In this case, since simple tag information is transmitted to the reader 200 by using a communication channel having a broad bandwidth of 200 Mhz, the amount of power consumed by a battery built into the tag 100 is large.

Therefore, in a case of transmitting simple tag information to the reader 200, the tag 100 according to an embodiment of the present invention may transmit the tag information to the reader 200 by using the communication channel having the first bandwidth, and in a case of transmitting positioning information to the reader 200, the tag 100 according to an embodiment of the present invention may transmit the positioning information to the reader 200 by using the communication channel having the second bandwidth which is broader than that of the first bandwidth. Accordingly, the amount of power consumed by the battery built into the tag 100 is reduced.

Moreover, in a case of transmitting the positioning information to the reader 200, the tag 100 according to an embodiment of the present invention may not periodically transmit the positioning information to the reader 200 but may transmit the positioning information to the reader 200 by using the communication channel having the second bandwidth at only a specific time when movement of a production or a pallet is stopped. Accordingly, the amount of power consumed by the battery built into the tag 100 is reduced.

Hereinafter, the tag 100 and the reader 200 will be described in detail.

Tag 100

The tag 100 may include a communication module 110, a positioning module 120, a global positioning system (GPS) module 130, a movement sensor 140, a battery 150, and a controller 160.

The communication module 110 may start to operate with power supplied from the battery 150. The communication module 110 may transmit tag information, transferred from the controller 160, to the reader 200 by using the communication channel CH1 having the first bandwidth and may receive, through the communication channel CH1, the tag information transmitted from the reader 200.

The tag information may fundamentally include a tag identifier (ID). Also, the tag information may include movement sensing information indicating a moving state of a product or a pallet to which the tag 200 is attached, movement completion information indicating a state where movement of the product or the pallet is stopped, a request message requesting position information of the tag 200, and/or the like.

Although not shown, the communication module 110 may be implemented with an analog filter, an amplifier, a mixer, and a combination thereof. The elements are well known to those skilled in the art, but their detailed descriptions are not provided.

The positioning module 120 may start to operate with the power supplied from the battery 150. The positioning module 120 may transmit positioning information, transferred from the controller 160, to the reader 200 by using the communication channel (hereinafter referred to as a positioning channel) CH2 having the second bandwidth which is broader than the first bandwidth.

Although not shown, the positioning module 120 may also be implemented with an analog filter, an amplifier, a mixer, and a combination thereof. The elements are well known to those skilled in the art, but their detailed descriptions are not provided.

The GPS module 130 may receive a GPS signal from a satellite and may transfer the received GPS signal to the controller 160.

The movement sensor 140 may transfer movement sensing information, which is obtained by the tag 200 continuously sensing a moving state of a product or a pallet to which the tag 200 is attached, to the controller 160.

The controller 160 may analyze the movement sensing information transferred from the movement sensor 140 to determine whether the product or the pallet starts to move or whether movement of the product or the pallet is completed.

The battery 150 may supply the power to the elements 110, 120, 130, 140 and 150 of the tag 100 according to control by the controller 160.

The controller 160 may be an element that manages overall operations of the elements 110, 120, 130, 140 and 150. In detail, the controller 160 may activate (or operate) the communication channel 110 for transmitting, to the reader 200, movement completion information indicating completion or not of movement and the movement sensing information transferred from the movement sensor 140.

In order to activate the communication channel 110, the controller 160 may control the battery 150 to supply the power to the communication module 110.

Moreover, when a request message requesting position information of the tag 200 is received from the reader 200 through the communication module 110, the controller 160 may activate the positioning module 120 so as to transmit positioning information to the reader 200 in response to the received request message and may simultaneously deactivate the activated communication module 110.

Reader 200

The reader 200 may include a communication module 210, a positioning module 220, a controller 230, and a network interface 250. Although not shown, the reader 200 may include a battery that supplies power. The reader 200 may operate with the power supplied from the battery, or may operate with the power that is supplied from an external power supply unit through a power supply line.

The communication module 210 may start to operate with the power supplied from the battery. The communication module 210 may transmit tag information, including movement sensing information and movement completion information, from the communication module 110 of the tag 100 by using the communication channel CH1 having the first bandwidth. Also, the communication module 210 may transmit a request message, requesting position information of the tag 100 from the server 300, to the communication module 110 of the tag 100 by using the communication channel CH1.

The positioning module 220 may receive the positioning information from the positioning module 120 of the tag 100 by using the communication channel CH2 having the second bandwidth which is broader than the first bandwidth.

The controller 230 may manage operations of the elements 210, 220, 240 and 250 of the reader 200.

In detail, the controller 230 may activate the communication module 210 so as to receive tag information including movement sensing information and movement completion information. In order to activate the communication module 210, the controller 230 may control the battery to supply the power to the communication module 210.

Moreover, the controller 230 may activate the positioning module 220 so as to receive the positioning information and may simultaneously deactivate the communication module 210. In order to activate the positioning module 220, the controller 230 may control the battery to supply the power to the positioning module 220, and in order to deactivate the communication module 210, the controller 230 may control the battery 240 to block the supply of the power to the communication module 210.

The controller 230 may transfer, to the network interface 250, the tag information which includes the movement sensing information and the movement completion information and has been received through the communication channel CH1 having the first bandwidth and the positioning information received through the positioning channel CH2.

The network interface 250 may be configured to access a wired/wireless network 25 and may transfer various pieces of information to the server 300 through the wired/wireless network 25.

By using the transferred tag information and positioning information, the server 300 may monitor a continuous position of a product until after the release of the product from a time when the product is warehoused, and may set a current product state as a display state in a system to visually provide the set display state to a manager.

Figure 2A:
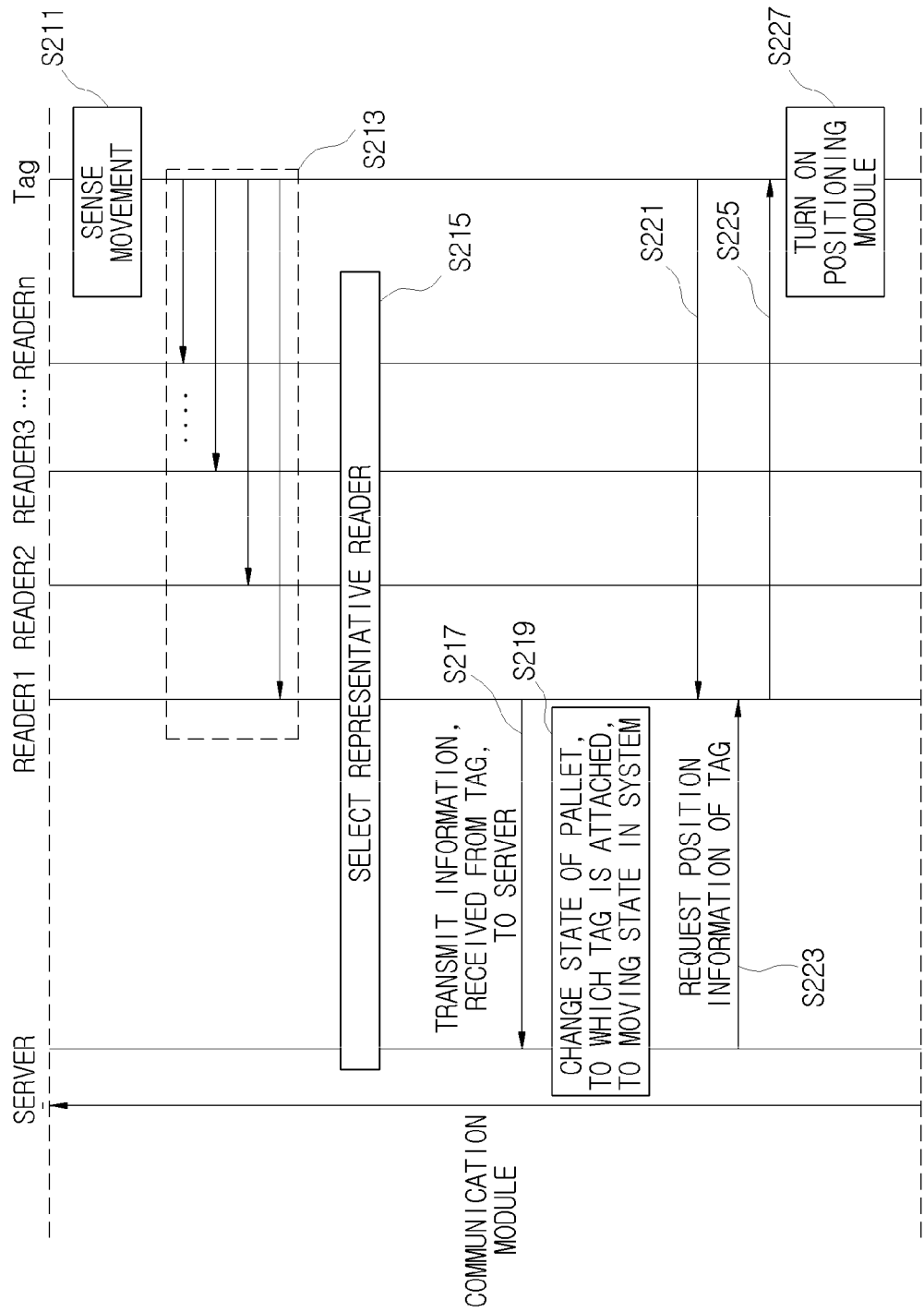

FIGS. 2A and 2B are a flowchart illustrating a flow of information transmitted or received between the tag, the server, and the plurality of readers included in the logistics tracking system illustrated in FIG. 1. To help understanding of description, the following description will be made with reference to FIGS. 1 and 2.

Referring to FIGS. 2A and 2B, the flow of the information transmitted or received between the tag 100, the server 300, and the reader may be divided into operation flows S211 to S227 of the communication modules 110 and 210 and operation flows of the positioning modules 120 and 220.

Referring to FIG. 2A, To describe the operation flows S211 to S227 of the communication modules 110 and 210, the movement sensor 140 built into the tag 100 attached to a product or a pallet may start to sense movement of the product or the pallet in step S211.

In step S213, when the movement sensor 140 senses movement of the tag 100 (actually, movement of the product or the pallet to which the tag 100 is attached), the movement sensor 140 may transmit movement sensing information, indicating that there is movement at a time when the movement is sensed, to a plurality of readers 1 to N located near the product or the pallet by using the communication channel having the first bandwidth which less consumes the power of the battery 150.

Subsequently, in step S215, a representative reader may be selected from among the plurality of readers 1 to N, based on the transmitted movement sensing information. The representative reader may be a reader located at a position closest to the tag 100. A method of selecting the representative reader may be a method that selects the representative reader, based on intensity at which each of the readers 1 to N receives the movement sensing information from the tag 100. The representative reader may digitize its own reception intensity and may share information of the digitized reception intensity by using the wired/wireless network.

In other embodiments, the server 300 may select the representative reader. For example, each of the readers 1 to N may transmit its own reception intensity information to the server 300 without sharing the reception intensity information with the other readers, and the server 300 may analyze the transmitted pieces of reception intensity information to select, as the representative reader, a reader that transmits a highest reception intensity value. In FIG. 2, an example of selecting the reader 1 as the representative reader is illustrated.

In step S217, the reader 1 selected as the representative reader may transmit the movement sensing information, received from the tag 100, to the server 300 through the wired/wireless network 25.

In step S219, when the movement sensing information is received, the server 300 may change a current state of the product or the pallet to a moving state and may provide the moving state to the manager through a system screen.

In step S221, if the movement sensor 140 built into the tag 100 does not sense movement of the tag 100 for a predetermined time, the tag 100 may determine movement of the tag 100 as being stopped and may transmit movement completion information, indicating movement of the tag 100 being stopped, to the representative reader 1 by using the communication channel having the first bandwidth which less consumes the power of the battery 150.

The representative reader 1 may transmit the transmitted movement completion information to the server 300.

In step S223, the server 300 may transmit a request message, requesting position information of the tag 200, to the representative reader 1 in response to the transmitted movement completion information.

In step S225, the representative reader 1 may transmit the request message to the tag 100 by using the communication channel CH1.

In step S227, the controller 160 included in the tag 100 which has received the request message through communication channel CH1 may block the supply of the power from the battery 150 to the communication module 110 to turn off the communication module 110 and may simultaneously control the battery 150 to supply the power to the positioning module 120, thereby turning on the positioning module 120.

Referring to FIG. 2B, To describe operation flows S229 to S235 of the positioning modules 120 and 220, when the positioning modules is turned on in step S227, the tag 100 may transmit positioning information to the readers 1 to N by using the positioning channel CH2 having the second bandwidth broader than the first bandwidth in step S229.

In step S231, when all the readers 1 to N receive the positioning information, the controller 160 of the tag 100 may control the battery to block the supply of the power to the positioning module 120 to turn off the positioning module.

As described above, in an embodiment of the present invention, only when the server 300 requests position information from the tag 100, the controller 160 may turn on the position module, thereby decreasing the number of operations of the positioning module. That is, the number of times the positioning information is transmitted through the positioning channel having a broad bandwidth is reduced, and thus, power consumption of the battery 150 is reduced.

In step S233, each of the readers 1 to N may transmit the positioning information, received through the positioning channel, to the server 300.

In step S235, the server 300 may analyze a reception intensity of the received positioning information to select pieces of positioning information respectively received from three readers closest to the tag 100.

In step S237, the server 300 may perform an arithmetic operation on the selected three pieces of positioning information in a triangulation technique to acquire the position information of the tag 100.

In step S239, when the position information of the tag 100 is acquired, the server 300 may change a moving state of the tag 100, displayed on the system screen, to a position information display state of displaying the position information of the tag 100 and may provide the position information display state to the manager.

Figure 3:
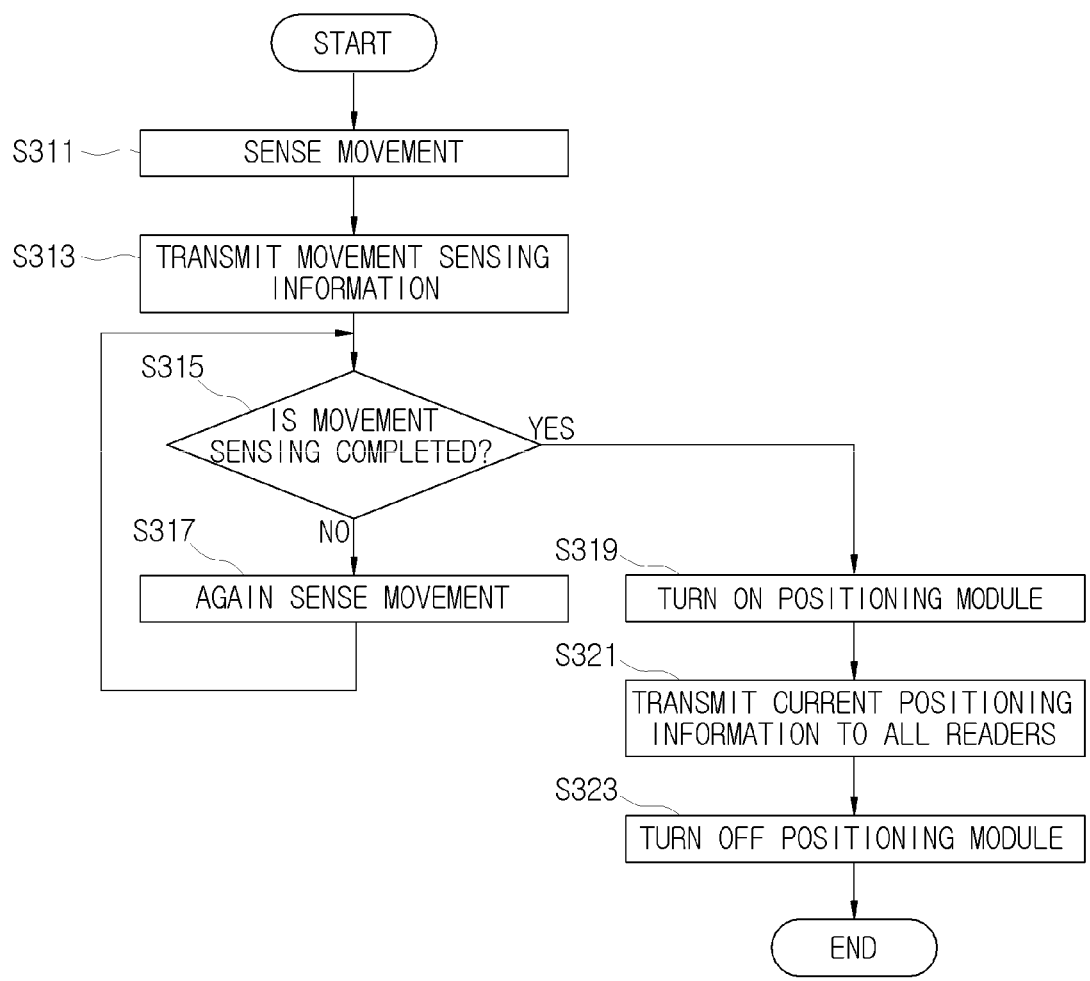
FIG. 3 is a flowchart illustrating a process of operating a tag illustrated in FIG. 1.

FIG. 3 is a flowchart illustrating a process of operating a tag illustrated in FIG. 1.

Referring to FIG. 3, in step S311, the tag attached to a product or a pallet may sense movement of the product or the pallet.

Subsequently, when the movement is sensed, the tag may transmit a result of the sensing (movement sensing information) to a reader by using the communication channel CH1 which less consumes the power of the battery. Such a transmission operation may be continuously performed until the movement is not sensed.

Subsequently, in step S315, whether movement of the product or the pallet is completed is determined. For example, when the movement is not sensed for a predetermined time, the movement of the product or the pallet is determined as being completed. For example, when the movement is again sensed within a predetermined time, the tag may continuously sense movement of the product or the pallet in step S317.

When the movement of the product or the pallet is completed, the tag may transmit movement completion information, indicating that the movement of the product or the pallet is completed, to the reader by using the communication channel, and the reader may transfer the transmitted movement completion information to the server.

In step S319, the server may transmit a request message, requesting position information of the tag, to the tag through the reader in response to the movement completion information received from the reader, and the tag may turn on the positioning module according to the request message received through the reader and may simultaneously turn off the communication module.

When the positioning module is turned on, the tag may transmit positioning information to a plurality of readers. When the transmission of the positioning information is completed, the tag may turn off the positioning module, and thus, a series of operations performed by the tag may be ended.

Figure 4:
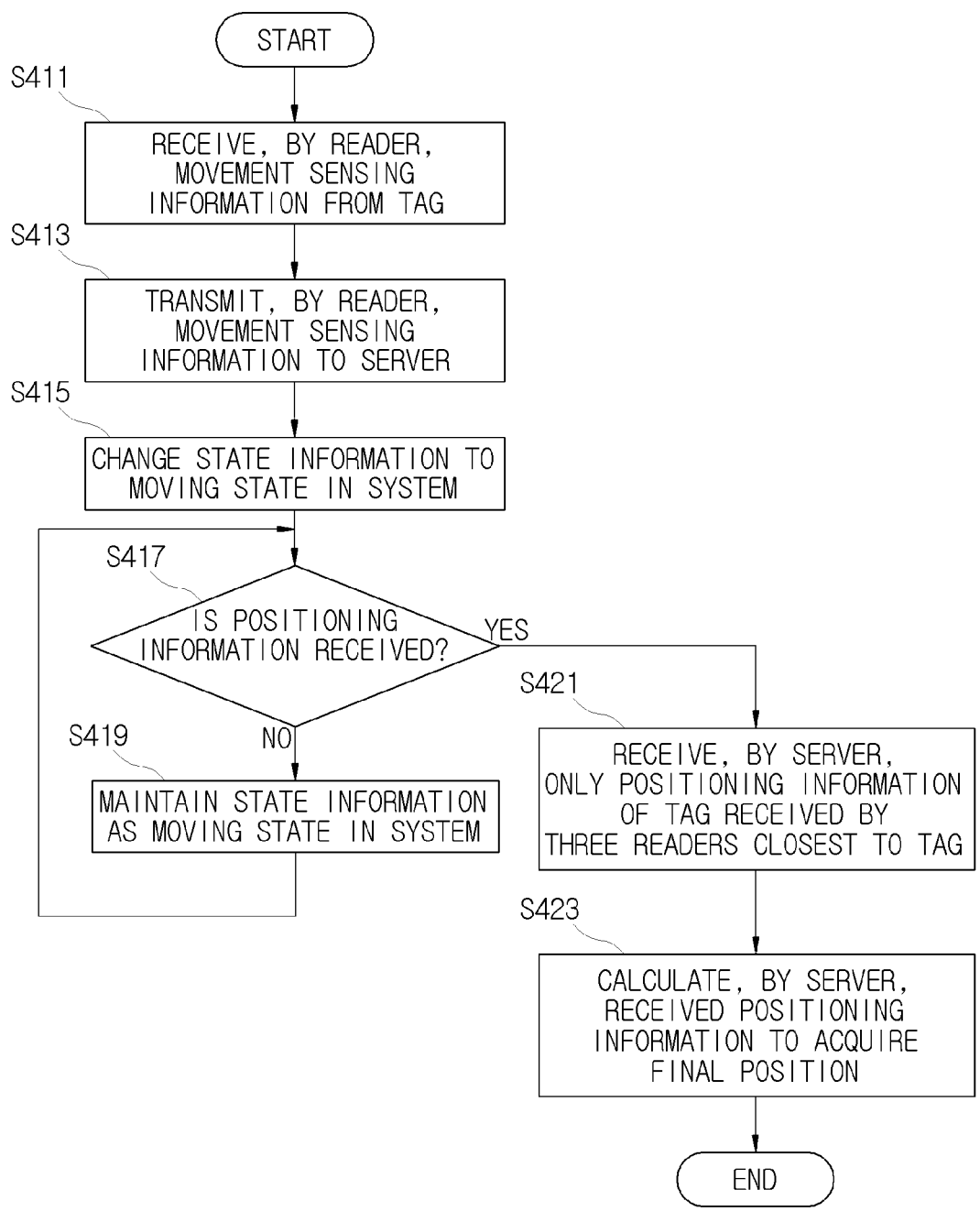
FIG. 4 is a flowchart illustrating a process of operating a reader and a server illustrated in FIG. 1.

FIG. 4 is a flowchart illustrating a process of operating the reader and the server illustrated in FIG. 1.

Referring to FIG. 4, in step S411, the plurality of readers may receive movement sensing information from the tag by using the communication channel.

Subsequently, in step S413, a reader which has received the movement sensing information may be selected as a representative reader from among the plurality of readers, and the selected representative reader may transmit the received movement sensing information to the server.

Subsequently, when the server receives the movement sensing information, the server may set a current state of a product or a pallet to a moving state and may provide the moving state to a manager through a system screen.

Subsequently, in step S417, each of the plurality of readers may determine whether positioning information is received through the positioning channel. When it is determined that the positioning information is not received, the moving state displayed on the system screen of the server may be maintained in step S419.

When the plurality of readers receive the positioning information, each of the plurality of readers may transmit the positioning information to the server, and the server may select pieces of positioning information received from three readers closest to the tag in step S421.

Subsequently, in step S423, the server may perform an arithmetic operation on the selected three pieces of positioning information in the triangulation technique to acquire a final position of the tag.

As described above, unlike the related art of transmitting tag information and positioning information through one communication channel, the present invention divides the one communication channel into a communication channel and a positioning channel which have different bandwidths, the tag information is transmitted through a communication channel which less consumes power of a battery, and the positioning information is transmitted through the positioning channel which relatively more consumes the power of the battery, thereby decreasing power consumption of the battery.

According to the embodiments of the present invention, positioning information measured by an active RFID tag is not be periodically transmitted to a reader but is transmitted to the reader at only a specific time when there is no movement of the active RFID tag, and thus, power consumption of a battery is more reduced than a case of periodically transmitting positioning information.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of an active radio frequency identification (RFID) tag attached to a product or a pallet, the communication method comprising:
   transmitting movement completion information to a reader by using a communication channel, which consumes power of a battery, at a time when movement of the product or the pallet which is moving is not sensed, the movement completion information indicating movement completion of the moving product or pallet;
   receiving a request message, requesting position information of the tag corresponding to the movement completion information, from the reader by using the communication channel;
   activating a positioning channel, which consumes relatively more power of the battery that the communication channel, to transmit positioning information to the reader by using the activated positioning channel in response to the request message received through the communication channel; and
   when the transmission of the positioning information is completed, deactivating the positioning channel.

2. The communication method of claim 1, wherein
   the communication channel has a first bandwidth, and
   the positioning channel has a second bandwidth which is broader than the first bandwidth.

3. The communication method of claim 1, further comprising:
   before the transmitting of the movement completion information to the reader,
   sensing the movement of the moving product or pallet by using a movement sensor built into the tag; and
   when there is no movement of the moving product or pallet for a predetermined time, determining a time, when the predetermined time elapses, as a time when the movement of the moving product or pallet is not sensed.

4. An active radio frequency identification (RFID) tag attached to a product or a pallet, the RFID tag comprising:
   a battery;
   a communication module configured to communicate with a reader by using a communication channel which consumes power of the battery;
   a positioning module configured to communicate with the reader by using a positioning channel which consumes relatively more power of the battery than the communication module; and
   a controller configured to control the communication module and the positioning module to transmit movement completion information, indicating movement completion of the product or the pallet which is moving, to the reader through the communication channel at a time when movement of the moving product or pallet is not sensed, and when a request message requesting position information of the tag corresponding to the movement completion information is received from the reader through the communication channel, in response to the request message, deactivate the communication module and activate the positioning module to transmit positioning information to the reader by using the activated positioning module.

5. The RFID tag of claim 4, wherein when the transmission of the positioning information to the reader is completed, the controller deactivates the positioning module.

6. The RFID tag of claim 4, further comprising:
   a movement sensor configured to sense the movement of the product or the pallet,
   wherein when there is no movement of the moving product or pallet for a predetermined time, the controller determines a time, when the predetermined time elapses, as a time when the movement of the moving product or pallet is not sensed, and controls the communication module to transmit the movement completion information to the reader at the determined time.

7. The RFID tag of claim 4, wherein
   the communication channel has a first bandwidth, and
   the positioning channel has a second bandwidth which is broader than the first bandwidth.

8. A communication method between an active radio frequency identification (RFID) tag attached to a product or a pallet, a reader, and a server which are included in a logistics tracking system, the communication method comprising:
   transmitting movement completion information to the reader by using a communication channel, which consumes power of a battery, at a time when movement of the product or the pallet which is moving is not sensed, the movement completion information indicating movement completion of the moving product or pallet;
   transmitting, by the reader, the movement completion information to the server over a wired or wireless network;
   transmitting, by the server, a request message requesting position information of the tag to the reader in response to the movement completion information; and
   receiving, by the tag, the request message from the reader by using the communication channel, deactivating the communication channel, activating a positioning channel which consumes relatively more power of the battery, transmitting positioning information to the reader by using the activated positioning channel in response to the received request message, and when the transmission of the positioning information is completed, deactivating the positioning channel.

* * * * *